No. 730,360. Patented June 9, 1903.

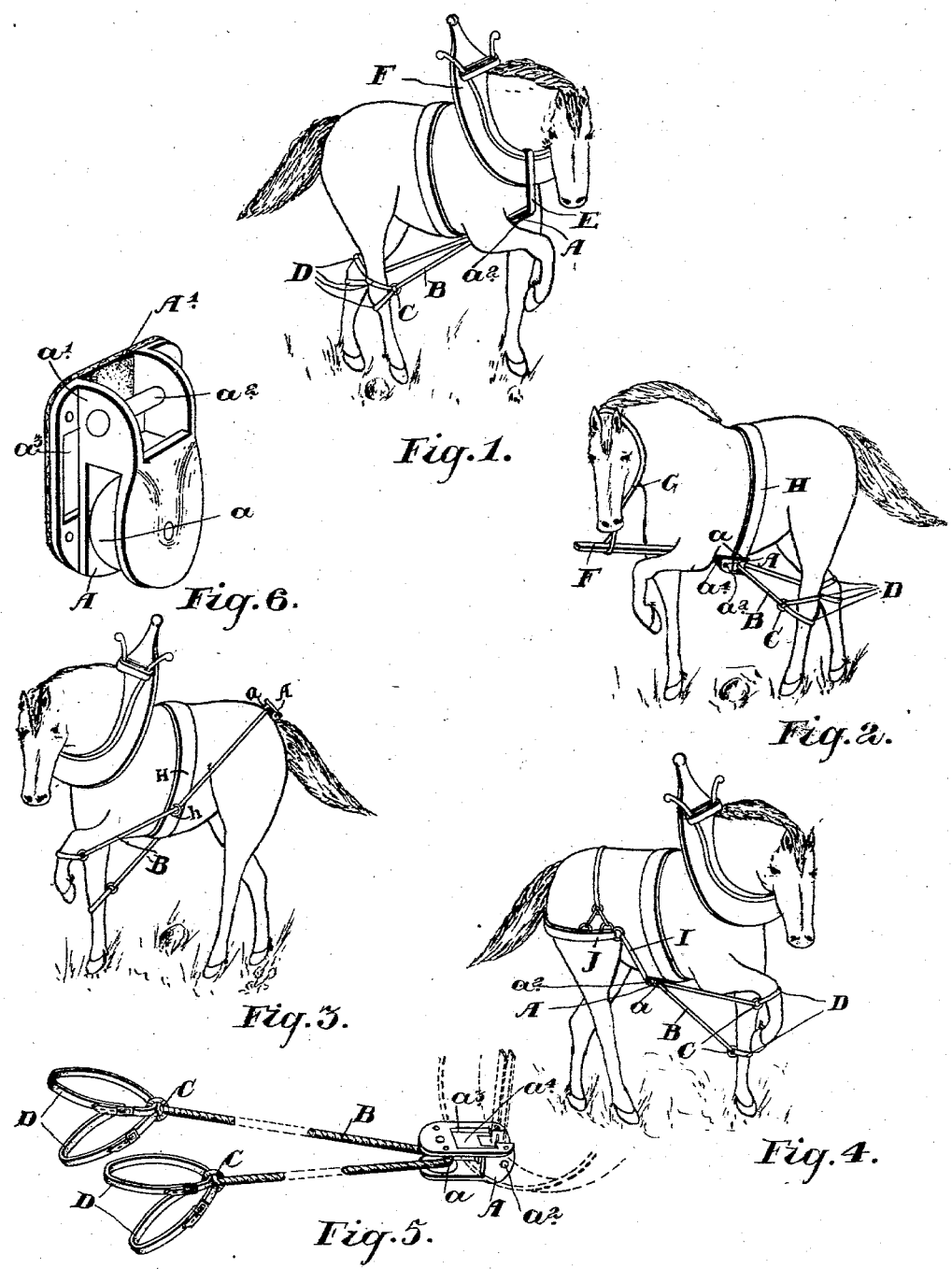

UNITED STATES PATENT OFFICE.

GEORGE FORSYTH, OF ST. DAVIDS, CANADA.

HORSE TAMING OR TRAINING DEVICE.

SPECIFICATION forming part of Letters Patent No. 730,360, dated June 9, 1903.

Application filed June 11, 1902. Serial No. 111,162. (No model.)

*To all whom it may concern:*

Be it known that I, GEORGE FORSYTH, horseman, of the village of St. Davids, in the county of Lincoln, in the Province of Ontario, Canada, have invented certain new and useful Improvements in Horse Taming and Training Devices, of which the following is a specification.

My invention relates to improvements in devices for taming or training horses; and the object of the invention is to provide a device for handling with safety and without cruelty vicious or uneducated horses or cattle, and particularly to prevent horses kicking in stalls, in double or single harness, to prevent horses from jumping or rearing in the field, and yet which will not interfere with a limited freedom of movement commensurate with the proper training of the animal; and it consists, essentially, of a block provided with a suitable pad, a pulley, and rod or cord having freedom of movement on said pulley and designed to be connected by straps to the fore or hind legs of the horse, and a suitable means for fastening the block to the belly-band, collar, or other portion of the harness, depending, of course, upon the use to which my device is to be applied, the parts being arranged and constructed in detail as hereinafter more particularly explained.

Figure 1 is a perspective view of a horse with my device attached, showing it in position to prevent the horse from kicking. Fig. 2 is a view showing my device applied to prevent it from kicking or jumping. Fig. 3 shows my device applied to prevent the horse from rearing. Fig. 4 is another view showing my device applied to prevent the horse from rearing. Fig. 5 is an enlarged detail of the device showing its construction. Fig. 6 is an enlarged detail of the block.

In the drawings like letters of reference indicate corresponding parts in each figure.

A is the main portion of my device, which consists of a block having a pulley $a$ suitably journaled therein, lugs $a'$, connected together by a cross-pin or pulley $a^2$, the side slots $a^3$ and recesses $a^4$, through which the band is designed to extend, as indicated in Fig. 5. I preferably use at the back also a pad A'.

B is a rope which passes around the pulley $a$ and is connected at the end to the rings C C. To one ring C the rope is permanently connected, and to the other the rope is suitably tied, so that the rope can be readily undone.

D D are two pairs of straps, the ends of which are connected by suitable buckles and inner portions of which extend through the rings C.

In Fig. 1 I show my device applied to a horse to prevent it from kicking. In this figure I show a supplemental strap E, connected to the cross-pin $a^2$ and extending around the collar F on the horse. The ropes extend around the pulley in the block A to the hind legs of the horse, to which they are connected by the straps D D, hereinbefore referred to.

In Fig. 2 I show a bar F, which extends into the recesses $a^4$ over the pin $a^2$ forwardly between the front legs of the horse. A rope G is connected to the outer end and passes around the neck of the horse, as indicated. In this form the block A is suitably secured to the belly-band or girth H, such girth passing through the side slots $a^3$ and central recess $a^4$, as indicated by dotted lines in Fig. 5. The form shown in Fig. 2 is designed to prevent a horse from jumping and also from kicking, the bar F having the rope G attached thereto being designed to prevent the former and the rope B, with the straps D, which pass around the leg of the horse, being designed to prevent the latter.

In Fig. 3 I show the ropes B passing through rings $h$ in the belly-band H at each side of the horse up and around the pulley $a$ in the block, the block A being suitably secured on the crupper to the tail. The straps in this instance pass around the fore legs of the horse.

In Fig. 4 I show the block A connected by a strap I, passing around the bolt or pin $a^2$, to the ring on the end of the breeching J. In this form also it will be noticed that the ropes which pass around the pulley $a$ extend to the fore legs of the horse and are provided with a ring C.

Both the forms shown in Figs. 3 and 4 are more especially designed to prevent rearing.

From the simplicity of the device and the various ways in which it can be applied it will readily be seen that it can be with equal facility adapted to curb, check, or otherwise educate a horse and I find in practice quickly relieves him from all objectionable tricks or pranks. At the same time it will be of course understood that on account of the freedom of movement of the rope through the pulley the ordinary movement of the horse will not be affected nor will the device be at all dangerous to the horse in its use.

What I claim as my invention is—

1. In a horse taming and educating device, the combination with the block provided with a pulley and side slots and recess and the girth designed to extend through the side slots, of a rope passing through the pulley and straps for connecting the ends to the legs of the horse as and for the purpose specified.

2. In a horse taming and educating device, the combination with the block provided with a pulley and side slots and recess, and the girth designed to extend through the side slots, of a rope passing through the pulley and straps for connecting the ends to the legs of the horse, a stick designed to be inserted in the recess and extending forwardly between the fore legs of the horse and a rope connection from such stick around the neck of the horse as and for the purpose specified.

GEORGE FORSYTH.

Witnesses:
M. McLAREN,
K. SHIELDS.